US009712029B2

(12) United States Patent
Bauch et al.

(10) Patent No.: US 9,712,029 B2
(45) Date of Patent: Jul. 18, 2017

(54) HOLDING MEANS FOR ELECTRICAL MACHINES

(71) Applicant: Robert Bosch GmbH, Stuttgart (DE)

(72) Inventors: Christa Bauch, Grossbottwar (DE); Guenter Rademacher, Filderstadt-Harthausen (DE); Martin Schulz, Kornwestheim (DE); Ngoc-Thach Nguyen, Grossbottwar (DE); Guillermo Saiz, Ludwigsburg (DE); Paola Zapico Fanjul, Stuttgart (DE); Vincent Riou, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/659,548

(22) Filed: Oct. 24, 2012

(65) Prior Publication Data

US 2013/0099616 A1    Apr. 25, 2013

(30) Foreign Application Priority Data

Oct. 24, 2011   (DE) .......................... 10 2011 085 118

(51) Int. Cl.
*H02K 1/27*      (2006.01)
*H02K 21/04*     (2006.01)
*H02K 1/24*      (2006.01)

(52) U.S. Cl.
CPC ........... *H02K 21/044* (2013.01); *H02K 1/243* (2013.01); *H02K 1/278* (2013.01); *H02K 1/2773* (2013.01)

(58) Field of Classification Search
CPC ........ H02K 1/2773; H02K 1/28; H02K 1/278; H02K 21/048; H02K 21/042; H02K 21/044; H02K 21/046

USPC ................ 310/263, 156.66, 156.72, 156.16, 310/156.01–156.84, 181
See application file for complete search history.

(56) References Cited

U.S. PATENT DOCUMENTS

| 5,828,155 A * | 10/1998 | Adachi | H02K 21/044 |
| | | | 310/181 |
| 6,376,956 B1 * | 4/2002 | Hosoya | H02K 1/17 |
| | | | 310/154.17 |
| 6,548,935 B1 * | 4/2003 | Shendi | H02K 21/044 |
| | | | 310/152 |
| 7,605,518 B2 * | 10/2009 | Nakamura | 310/263 |

(Continued)

FOREIGN PATENT DOCUMENTS

| DE | 19951155 | 5/2001 |
| DE | 102006041981 | 3/2008 |

(Continued)

OTHER PUBLICATIONS

WO 2009013330 A2 machine translation Mar. 9, 2015.*

*Primary Examiner* — Joshua Benitez-Rosario
*Assistant Examiner* — Leda Pham
(74) *Attorney, Agent, or Firm* — Michael Best & Friedrich LLP

(57) ABSTRACT

A holding element (68, 82) for attaching magnets (62) to a rotor (20) of an electrical machine (10). This electrical machine is, in particular, designed as an AC generator and comprises intermediate spaces (60) between the individual poles (24, 25). The holding element (68, 82) comprises a top side (72) and spring lugs (70) which axially fix the magnets (62). The holding element (68, 82) has claw-like projections (74) which bear against flanks (80) of the poles (24, 25) when the holding element (68, 82) is in the fitted state.

20 Claims, 7 Drawing Sheets

(56) References Cited

U.S. PATENT DOCUMENTS

| | | |
|---|---|---|
| 2008/0048516 A1 | 2/2008 | Oowatari et al. |
| 2009/0033167 A1 | 2/2009 | Bradfield |
| 2010/0001605 A1* | 1/2010 | Tajima ................ H02K 21/044 |
| | | 310/156.22 |
| 2012/0032548 A1 | 2/2012 | Bauch et al. |

FOREIGN PATENT DOCUMENTS

| | | | |
|---|---|---|---|
| DE | 102006041981 A1 * | 3/2008 | |
| DE | 102007032135 | 1/2009 | |
| DE | 102007034326 | 1/2009 | |
| DE | 102007034236 A1 * | 2/2009 | |
| DE | 102008044187 | 6/2010 | |
| DE | 102008044187 A1 * | 6/2010 | ............... H02K 1/22 |
| WO | WO 2009013330 A2 * | 1/2009 | |

* cited by examiner

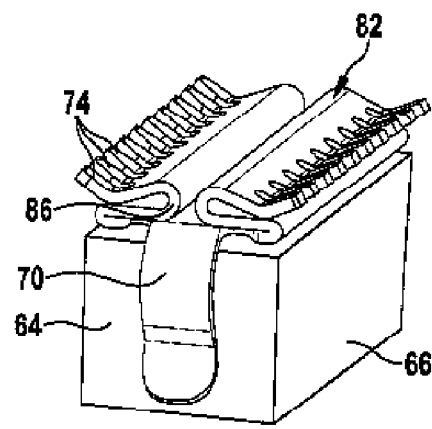
Fig. 6.1
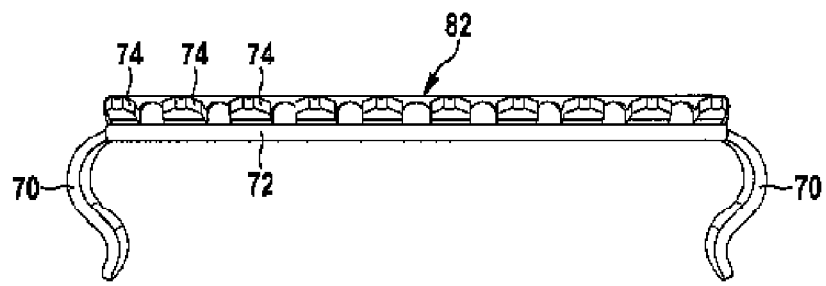
Fig. 6.2
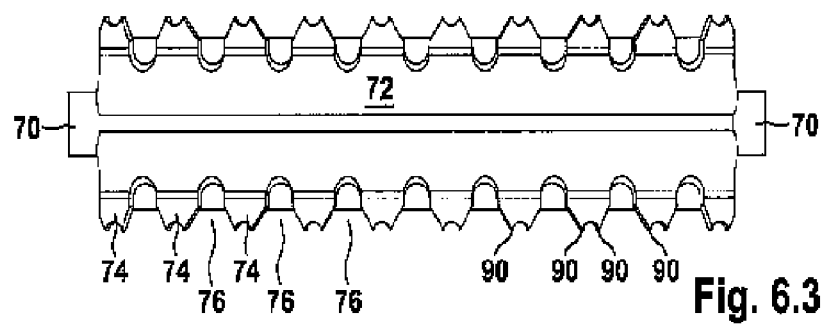
Fig. 6.3

HOLDING MEANS FOR ELECTRICAL MACHINES

BACKGROUND OF THE INVENTION

DE 10 2008 043 044 A1 relates to an apparatus for fixing magnets. For the purpose of increasing power by additional permanent magnetic field strength and for the purpose of reducing the magnetic stray flux, permanent magnets are inserted into intermediate spaces between the alternating poles on an electrical machine, said electrical machine being, in particular, a generator for a motor vehicle having an exciter system comprising a large number of electrically excited individual poles in the stator or rotor in the form of electromagnetically excited poles which are axially oriented over the circumferences and of which the polarity alternates with the circumferential direction. Said permanent magnets are held by means of a holding element which cannot be magnetically excited and which is held in pole slots on both sides.

DE 10 2006 041 981 A1 relates to an electrical machine. This electrical machine is, in particular, an electrically excited claw-pole generator for use in a motor vehicle. The claw-pole generator comprises a rotor with a large number of axially oriented poles, of which the magnetization changes in the circumferential direction, and with permanent magnets, which are arranged between the poles, for increasing power and for reducing the stray flux. The permanent magnets are secured by means of metal sheets which cannot be magnetized and are held in pole slots on both sides. These metal sheets each have at least one additional arresting means with which they are supported in the axial and radial direction at the pole flanks with or without stops or guide channels. The additional arresting means are designed, for example, as sheet-metal tabs which are bent or angled and are supported in a sprung manner against at least one axial end section of the poles.

DE 199 51 155 A1 likewise relates to an electrical machine. This electrical machine is a generator for a motor vehicle having an exciter system and a large number of electrically excited individual poles in the stator or in the rotor. In this case, the stator and the rotor are in the form of electromagnetically excited poles which are axially oriented over the circumference and polarity which alternates with the circumferential direction. In order to reduce the magnetic stray flux, permanent magnets are located in the intermediate spaces between the poles. The permanent magnets are inserted into said intermediate spaces. The permanent magnets are attached to the stator and/or to the rotor in such a way that the permanent magnets are each held by means of a holding element which cannot be magnetically excited, with said holding element being held in pole slots by caulking tangentially and axially on both sides and one pole slot being made on the longitudinal side of one pole and one pole slot being made on the longitudinal side of a mating pole which is situated opposite said first pole. The holding element covers the respective permanent magnets with a base region in the radial direction with respect to the stator in the case of a rotor, and in the radial direction with respect to the rotor in the case of a stator. The holding element has bent-away lugs on both opposite ends of the base region, said lugs exerting a clamping force on axial end sides of the permanent magnets used.

In the case of electrical machines such as the electrical machines known from DE 10 2006 041 981 A1 and DE 199 51 155 A1, high rotation speeds, ≥22,000 rpm, result in the claw pole of a claw-pole machine bending open radially outward. This deformation occurs to a greater or lesser extent in each case depending on the rotation speed of the electrical machine, DE 10 2008 044 187 A1 relates to an electrical machine, in particular a claw-pole generator. The claw-pole generator comprises a large number of poles which are associated with a rotor and have magnetic fields which are oriented in an alternating manner in the circumferential direction. Permanent magnets are arranged between the poles, with the permanent magnets each being attached by way of a clamping clip which has spring elements which are arranged in slots in the adjacent poles, these slots being produced, in particular, without the removal of material, or by way of a spring-ring section or spring ring which is arranged in slots in the permanent magnet and in slots in the adjacent poles, these slots being produced, in particular, without material being removed.

For a high power requirement, permanent magnets can be inserted between the respective claw-pole fingers in the case of claw-pole generators, as described above. Up until this point, the permanent magnets were either directly inserted into spaces which are produced by cutting-machining or adhesively bonded by means of adhesive or using an impregnating agent or fixed and positioned with additional sheet-metal or plastic supports with different specific characteristics. The high positioning and fixing tolerances between the individual components cause mechanical and electromagnetic unbalances and therefore a relatively high load in terms of noise and power losses, and a shorter service life can be expected. To date, these disadvantages, that is to say a relatively high development of noise, power losses and a relatively low expected service life, have had to be accepted in most cases.

SUMMARY OF THE INVENTION

Cutting-machining processing, in particular cutting-machining processing of fully fitted rotors on account of undesirable processing steel chips can be avoided by virtue of the solution proposed according to the invention. The power losses can be considerably minimized by virtue of the solution proposed according to the invention. This is caused primarily in that very small lateral air gaps can be formed between the permanent magnets and the claw flanks of the claw-pole fingers of the individual claw-pole boards through a supporting surface which is as small as possible. The highest possible lateral surface area overlap between the permanent magnets and the claw flanks is achieved by virtue of the solution proposed according to the invention—not least by virtue of the two connecting channels which were previously provided and into which the holding elements were previously pushed in order to arrest the permanent magnets being dispensed with. The radial magnetic throughflow area can once again be increased in size and therefore an increase in power in relation to the solution with the milled slots can be achieved by virtue of the solution proposed according to the invention.

Furthermore, the solution proposed according to the invention can have the result that the electrical machine has a significant increased degree of robustness in respect of mechanical, electrical and thermal loads. In line with the solution proposed according to the invention, the holding elements, in accordance with the barb principle, can be fitted or positioned between the claw-pole fingers very easily radially from the outside to the inside on account of their inherent elasticity in one direction. During operation, that is to say at high rotation speeds of the rotor of the electrical machine, individual projections, that is to say claw-like lugs of the holding element, are laterally and tangentially pressed or supported with greater force against the lateral flanks of the claw-pole fingers on account of the centrifugal force load which occurs, and therefore the supporting effect is further increased on account of the correspondingly proportional centrifugal force loading during operation. The greater the centrifugal force which occurs and to which the individual holding elements are exposed by the weight of the permanent magnets, the more strongly the claw-like projections, or the edges of the sprung lugs, are supported or engage fixedly on the lateral surface of the claw-pole fingers.

Recesses are located on the holding elements between the individual, laterally protruding sprung claw-like projections. These recesses allow an impregnating agent to flow into the empty spaces between the upper sides of the generally cuboidal permanent magnets and the sheet-metal lower sides of the holding element, so that, after the impregnating agent cures, the hollow spaces are filled on all sides with impregnating agent, this once again increasing the flexural rigidity of the composite comprising impregnating agent, holding element and fixed permanent magnets. As the impregnating agent passes, the permanent magnets are also covered over their entire surface area and even above the claws and therefore are also fixed after the impregnating agent cures.

A reduction in the mechanical electromagnetic unbalance can be achieved by virtue of the solution proposed according to the invention since the permanent magnets are axially and radially oriented by being exactly positioned by the holding elements, and therefore unbalances are minimized and ideally precluded. This is accompanied by a reduction in the noise level and an increase in the power and the ball bearing service life as a result of clearly definable spatial positioning, The solution proposed according to the invention also provides the option of magnetizing the permanent magnets before or after they are fitted in the intermediate spaces between the claw-pole fingers.

Production of the individual claw poles with the claw-pole fingers and cores can be simplified in that the side flanks thereof now no longer have to be subjected to cutting-machining processing in order to create pole slots in which the holding elements are arrested. Since this mechanical, cutting-machining working process can be dispensed with in the solution proposed according to the invention, less stringent requirements are made of the surface condition of the claw-pole fingers, and therefore said claw-pole fingers can be produced in a cost-effective manner. The channels which are to be made in the claw-pole finger contours are dispensed with, as is the requirement for a supporting shoulder which would have to be produced with dimensions with tight tolerances.

The appeal of the invention lies in the components being extremely simple to produce. In contrast to previous solutions, supporting surfaces which are provided on the claw-pole fingers can be designed to be just flat and without further requirements being made of the surface condition. Slots or guide channels which were generally produced by cutting-machining processing and have been required to date can be dispensed with. Furthermore, the holding metal sheet can be designed as a simple stamped and bent part. It is also possible to perform fitting processes which are simpler and primarily lead to higher degrees of accuracy in the following assemblies: these assemblies include the claws, the exciter wires or the slip-ring group and the fan impeller and the permanent magnets together with supports.

Very good accurate axial, radial and tangential association and positioning can be achieved between the individual claw-pole fingers by virtue of the solution proposed according to the invention, and therefore the installation space for accommodating and fixing the permanent magnets can be designed in an optimum manner. In particular, the exciter-side input and output wires are effectively positioned and fixed by skillfully shaped conical guides in the case of the two claws.

Furthermore, the impregnating agent, which into the intermediate spaces with which the holding elements and the permanent magnets which are fixed by said holding elements are encapsulated, can advantageously be used to increase the flexural rigidity of the composite comprising permanent magnets and the holding element.

The solution proposed according to the invention is further distinguished by a higher degree of robustness and also a clearly lower noise level, improved cooling and a greater degree of environmental protection.

BRIEF DESCRIPTION OF THE DRAWINGS

The invention will be described in greater detail below with reference to the drawings, in which.

DETAILED DESCRIPTION

Figure 1:
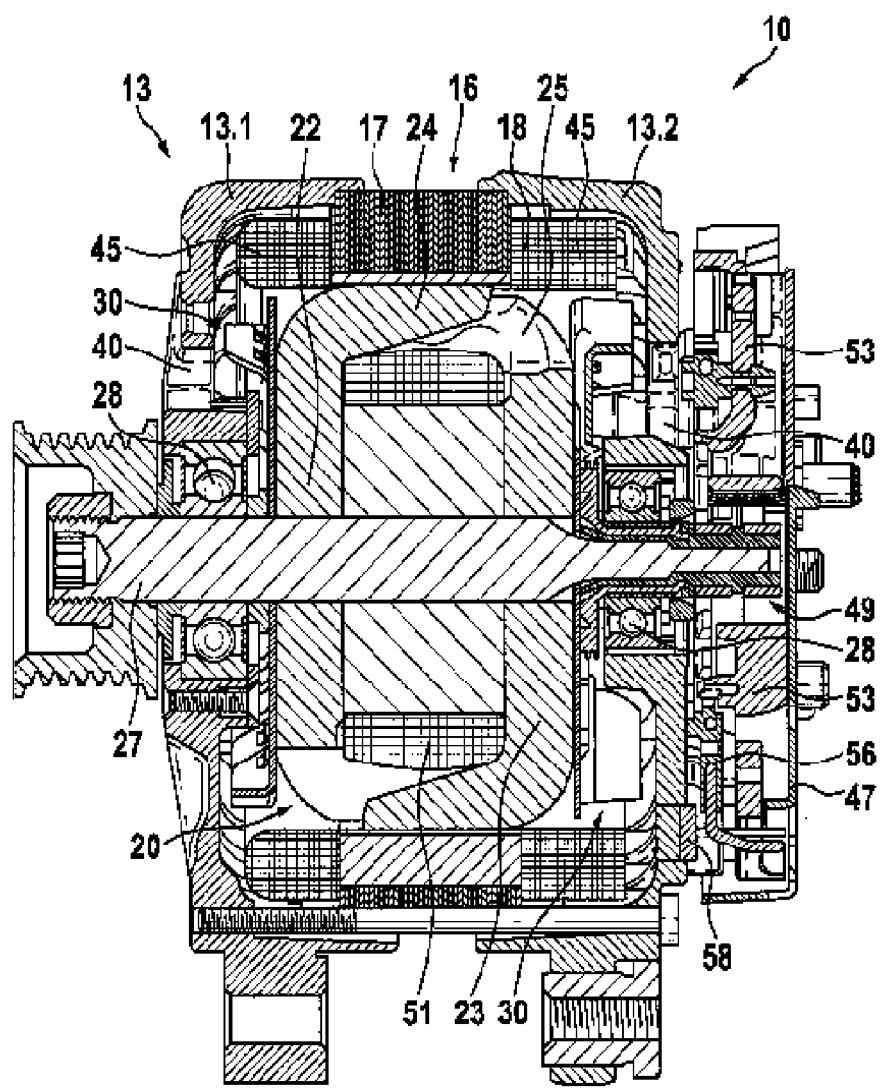
FIG. 1 shows a section through an electrical machine, in particular a claw-pole generator.

The illustration according to FIG. 1 shows a cross section through a generator as an electrical machine.

The electrical machine 10 according to the illustration in FIG. 1 is designed as a generator or provided as an alternator for motor vehicles in this case. The electrical machine 10 has, inter alia, a two-part housing 13 with end plates, said housing comprising a first end plate 13.1 and a second end plate 13.2. The end plate 13.1 and the end plate 13.2 accommodate a stator 16, which firstly comprises a stator core 17 substantially in the form of a circular ring and projecting stator windings 18 are inserted or drawn into the slots in said stator, said slots being directed radially inward and extending axially. The annular stator 16 surrounds, by way of its radially inwardly directed slotted surface, a rotor 20 which is in the form of a claw-pole rotor. The rotor 20 comprises, inter alia, two claw-pole boards 22 and 23, with claw-pole fingers (also called poles) 24 and 25 which each extend in the axial direction being arranged on the outer circumference of said claw-pole boards. Both claw-pole boards 22 and 23 are arranged in the rotor 20 in such a way that the claw-pole fingers 24 and 25 thereof, which extend in the axial direction, alternate with one another over the circumference of the rotor 20. This results in magnetically required intermediate spaces between the oppositely (electro)magnetized claw-pole fingers 24 and 25, which are referred to as claw-pole intermediate spaces. The rotor 20 is mounted rotatably in the respective end plates 13.1 and 13.2 by means of a shaft 27 and in each case one roller bearing 28 located on each rotor side.

The rotor 20 has a total of two axial claw end sides or rear surfaces, to which in each case one fan 30 is attached. The fan 30 substantially comprises a plate-like or disk-like section, from which fan blades emanate in a known manner. The fans 30 serve the purpose of providing the possibility of air exchange between the outside of the electrical machine 10 and the interior space in the electrical machine 10 via openings 40 in the end plates 13.1 and 13.2 in order to allow air cooling to be implemented. For this purpose, the openings 40 are provided substantially at the axial ends of the end plates 13.1 and 13.2, via which cool air is drawn by suction into the interior pace in the electrical machine 10 by means of the fans 30. The cool air is accelerated radially outward by the rotation of the air, with the result that said air can pass through the overhang 45 through which cooling air can pass. Owing to this effect, the winding overhang 45 is cooled. Once it has passed through the winding overhang 45 or once it has flowed over this winding overhang 45, the cooling air takes a path radially outwards, through openings not illustrated here in FIG. 1.

On the right-hand side in FIG. 1 there is a protective cap 47, which protects various components from environmental influences. For example, this protective cap 47 covers a slip-ring assembly 49 which has the task of supplying field current to a field winding 51. Arranged around this slip-ring assembly 49 is a heat sink 53, which in this case acts as a positive heat sink. The end plate 13.2 acts as a negative heat sink. A connection plate 56 is arranged between the end plate 13.2 and the heat sink 53 and serves the purpose of connecting the negative diodes 58 which are arranged in the end plate 13.2 and in this case the positive diodes (not shown in the illustration according to FIG. 1) in the heat sink 53 to one another and therefore of forming a bridge circuit, that is to say a rectifier, which is known per se.

Figure 2:
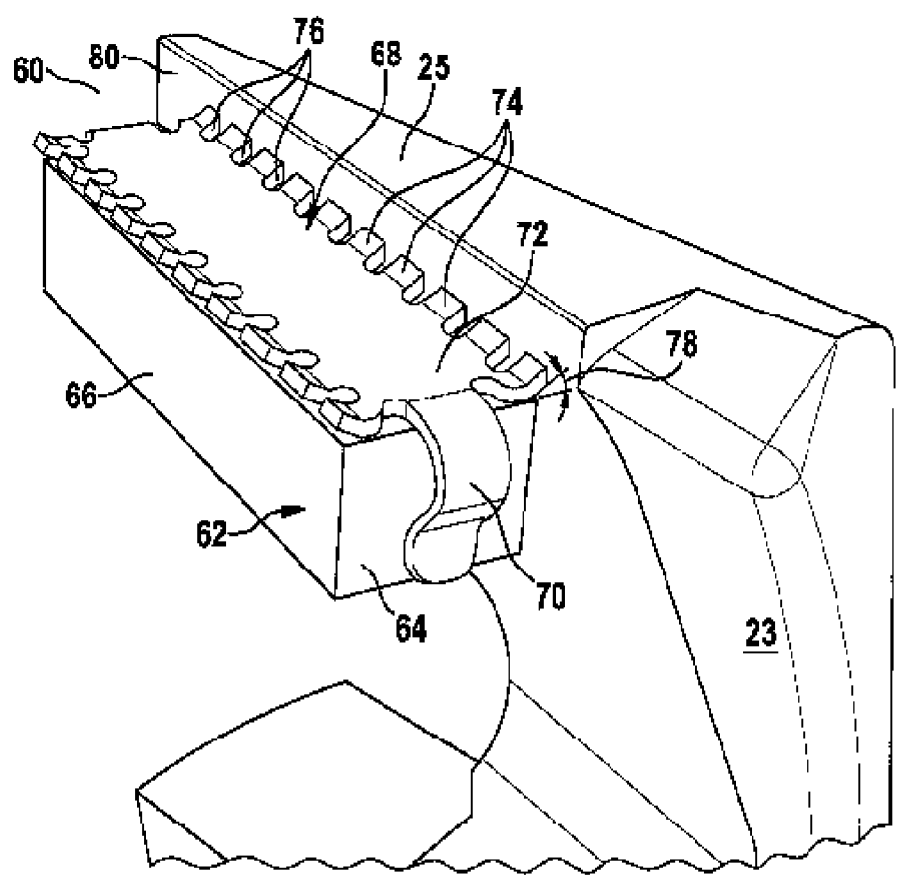
FIG. 2 shows an illustration of a first design variant of the holding elements proposed according to the invention with sprung claw-like projections.

FIG. 2 shows a first design variant of the holding element proposed according to the invention for fixing a magnet, in particular a permanent magnet.

According to FIG. 2, an intermediate space 60 is formed between the claw-pole finger 25, the claw-pole board 23 and a further claw-pole finger—not illustrated in the drawing in this case—which is oriented in the opposite direction to the claw-pole finger 25. A magnet, in particular a permanent magnet 62, is inserted or clamped into said intermediate space 60 which is bounded by flanks 80, which face one another, of the claw-pole fingers 24, 25 in each case and extends in a slightly inclined manner in the axial direction. The permanent magnet 62 has an end side 64 and two longitudinal sides 66 which run substantially parallel to one another. The magnet which is illustrated in FIG. 2, in particular which is in the form of a permanent magnet 62, is fixed and positioned in a clamping manner in the intermediate space 60 by means of a first holding element 68.

As can be seen in the illustration according to FIG. 2, the first holding element 68 in the design variant illustrated in FIG. 2 comprises at least one spring lug 70 which engages over the end side 64. The spring lug which starts opposite a top side 72 of the first holding element 68 is not illustrated for reasons of clarity of the illustration of the drawing. The perspective reproduction of FIG. 2 shows that the first holding element 68 has claw-like projections 74, which are arranged in rows, starting from its top side 72. The claw-like projections 74 extend substantially parallel along the longitudinal sides 66 of the permanent magnet 62 which is topped by the top side 72 of the first holding element 68. The perspective reproduction according to FIG. 2 shows that the claw-like projections 74 which are formed along the longitudinal sides of the top side 72 of the first holding element 68 are separated from one another by recesses 76. Furthermore, the claw-like projections 74 are provided with a straight side which is supported on the flank 80 of the claw-pole fingers 25 and 24 (claw-pole finger 24 is not illustrated here) which is only roughly processed. FIG. 2 also shows that the claw-like projections 74 are in the form of spring lugs which are arranged at a setting angle 78 with respect to the flat face of the top side 72.

Using the first design variant of the holding elements 68—as illustrated in FIG. 2—makes it possible, in a particularly simple manner, to fix the permanent magnets 62 in the intermediate spaces 60 which are formed between two claw-pole fingers 24, 25 which are oriented in opposite directions to one another. With the formation of extremely small air gaps and consequently with the formation of an optimum magnetic field flux, the solution proposed according to the invention can result in the flanks 80 of the claw-pole fingers 24, 25 remaining substantially unprocessed, so that the cutting-machining rotor processing thereon can be largely dispensed with, this having a highly favorable effect on the production costs of an electrical machine which is provided with the holding elements proposed according to the invention, for example a claw-pole generator.

Taking account of the fact that the permanent magnets 62 which are fixed in the intermediate spaces 60 by the first holding element 68 when the rotor 20 of the electrical machine rotates force the holding elements outward due to corresponding centrifugal forces, the claw and barb effect of the claw-like projections 74 into the naturally rough flanks 80 of the claw-pole fingers 24 and 25 is assisted and critically intensified. This means that, by virtue of the solution proposed according to the invention, the securing function which the first holding element 68 exerts on the respectively held permanent magnets 62 is further intensified as the rotation speed increases at extremely high rotation rates of the rotor 20 of the electrical machine.

Figure 3:
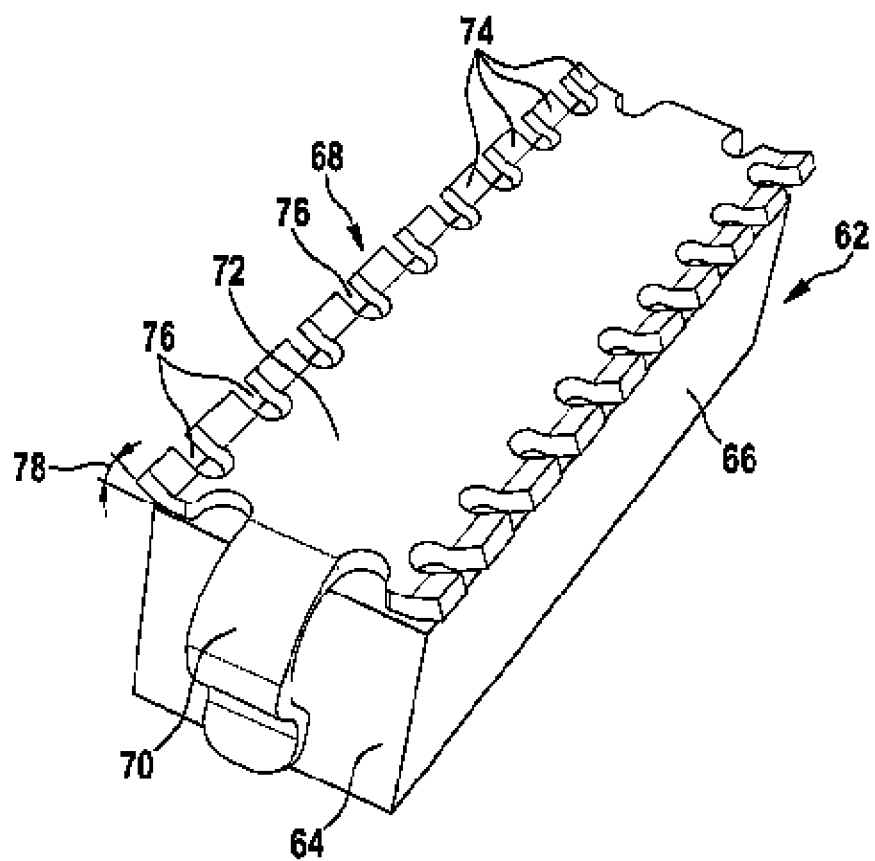
FIG. 3 shows a perspective plan view of a permanent magnet which is fixed by a holding element which is designed according to the invention in line with FIG. 2.

The perspective view according to FIG. 3 shows that the claw-like and barb-like projections 74, which opposite one another spaced apart from one another in each case by recesses 76, have straight sides. This allows position clamping compensation between the holding element 68.

As a result, linear contact is produced between the claw-like projections 74 which are sprung at the setting angle 78 and the rough flanks 80 of the claw-pole fingers 24, 25 on the other hand. The claw-pole fingers 24 and 25 extend in an alternating order slightly inclined from one another in a manner oriented in opposite directions in claw-pole boards 22, 23 which can be inserted one into the other, cf. the illustration according to FIG. 1.

FIG. 3 shows that a setting angle 78 between the upper side of the permanent magnets 62 on one hand and the lower side of the claw-like claw-like projections 74, which are in the form of spring lugs, is in the range of between 0° and 45°, in particular in a range of between 10° and 35°. Setting angles 78 of up to 60° are possible in the case of flanks which have defined and oriented roughnesses.

The perspective plan view according to FIG. 3 shows that one of the spring lugs 70 of the first holding element 68 overlaps the end side 64 of the permanent magnet 62. The spring lugs 70, which are formed opposite one another on the two short sides of the first holding element 68, fix the permanent magnets 62 in the axial direction.

Figure 4:
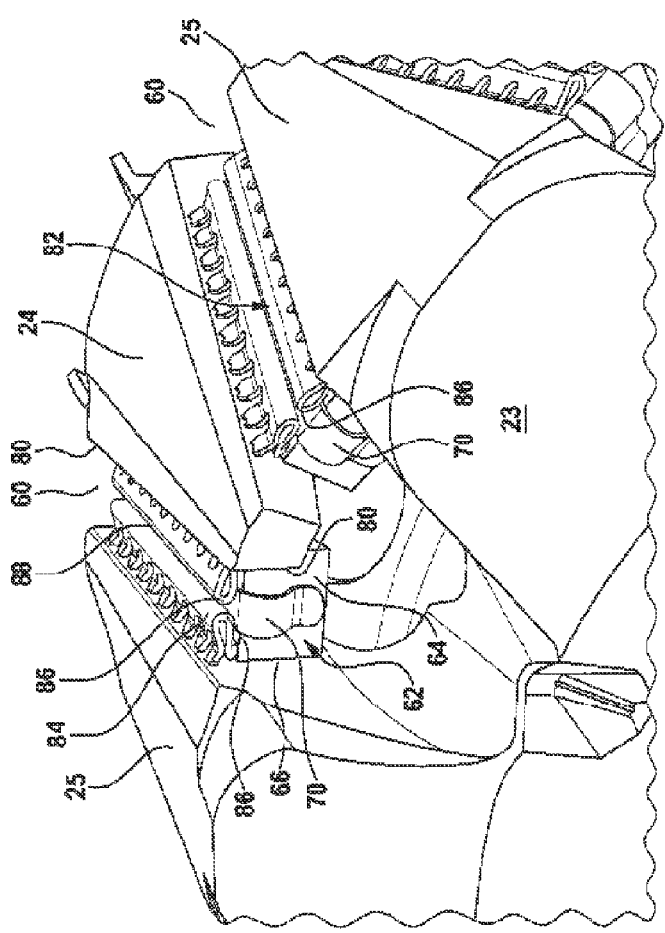
FIG. 4 shows a further design variant of the solution proposed according to the invention with a folded double lug on the holding element in the fitted state.

The illustration according to FIG. 4 shows a further second design variant of the holding elements proposed according to the invention for fixing magnets to the rotor of electrical machines.

FIG. 4 shows the view of a rotor 20 from the side of one of the claw-pole boards 23. The magnet, which is designed as a permanent magnet 62 in particular, is located in the intermediate space 60 which extends between the claw-pole fingers 24 and 25 which are oriented in an alternating manner in relation to one another in opposite directions. Said magnet is held by a second holding element 82 in the design variant according to FIG. 4. The second holding element 82 which is illustrated in a perspective view according to FIG. 4 differs from the first holding element 62 in that a double lug 84 which describes a 180° bend, called a rounded portion 86, is formed in a manner extending from the top side 72 of the second holding element 82. In this design variant, that is to say in the case of the second holding element 82, the claw-like projections 74 are located at the start of the rounded portion 86 facing in the radial direction of the flanks 80 of the claw-pole fingers 24 and 25. Analogously to the first holding element 68, sprung spring lugs 70 overlap the end sides 64 of the permanent magnets 62, and therefore the permanent magnet 62 is axially fixed in the axial direction in the intermediate space 60 between the claw-pole fingers 24, 25.

The design variant of the second holding element 82 illustrated in FIG. 4 shows, overall, the dedicated supporting surface which is available for separately supporting the permanent magnet 62 on an enlarged scale. Therefore, the metal sheet, from which the second holding element 82 is produced for example, can be designed to be thinner, is therefore more flexible, as a result of which the fitting forces, taken as a whole, can be definably reduced. In the case of the second design variant, illustrated in FIG. 4, of the holding element proposed according to the invention, the magnets, in particular the permanent magnets 62, on the holding element can be pushed into the fully fitted rotor axially and primarily radially exactly into the intermediate spaces 60 between the flanks 80 of the individual claw-pole fingers 24 and 25, and positioned there. A rotor 20 which is equipped with permanent magnets 62 in such a way is distinguished by relatively low unbalances and relatively quiet running, this being beneficial for the employed roller bearings of the rotor 20.

In the case of the second holding element 82 according to the perspective plan view in FIG. 4, the permanent magnet 62 can be axially and radially positioned and fixed in a sprung manner by skilled shaping of the material of the second holding element 82 which is composed of non-electromagnetic material.

By virtue of the folding contour and/or the position of double lugs (cf. illustration according to FIG. 5), the locations or regions which require particularly high strengths or stiffnesses or spring elasticity can be optimized. For example, a very high flexural rigidity is provided along the center of the magnet in front of the double lugs, and greater elasticity is provided in the claw regions. The surface of the second holding elements 82 which bears against the permanent magnets 62 has the requisite flatness because it is delimited from the claw regions by a double lug, cf. the illustration according to FIG. 5.

As can be seen in the illustration according to FIG. 4, a longitudinal slot 88, which extends in the axial direction, in the top side 72 of the second holding element 82 is produced through the double lug 84 of the second holding element 82 by virtue of the opposite rounded portions 86. The perspective illustration according to FIG. 4 shows very clearly, in particular, the alternating arrangement of the claw-pole fingers 24, 25 and the oblique position of the individual permanent magnets 62 which are fixed by the second holding element 82 and in which intermediate spaces 60 are produced between the flanks 80 of the claw-pole fingers 24, 25.

Figure 5:
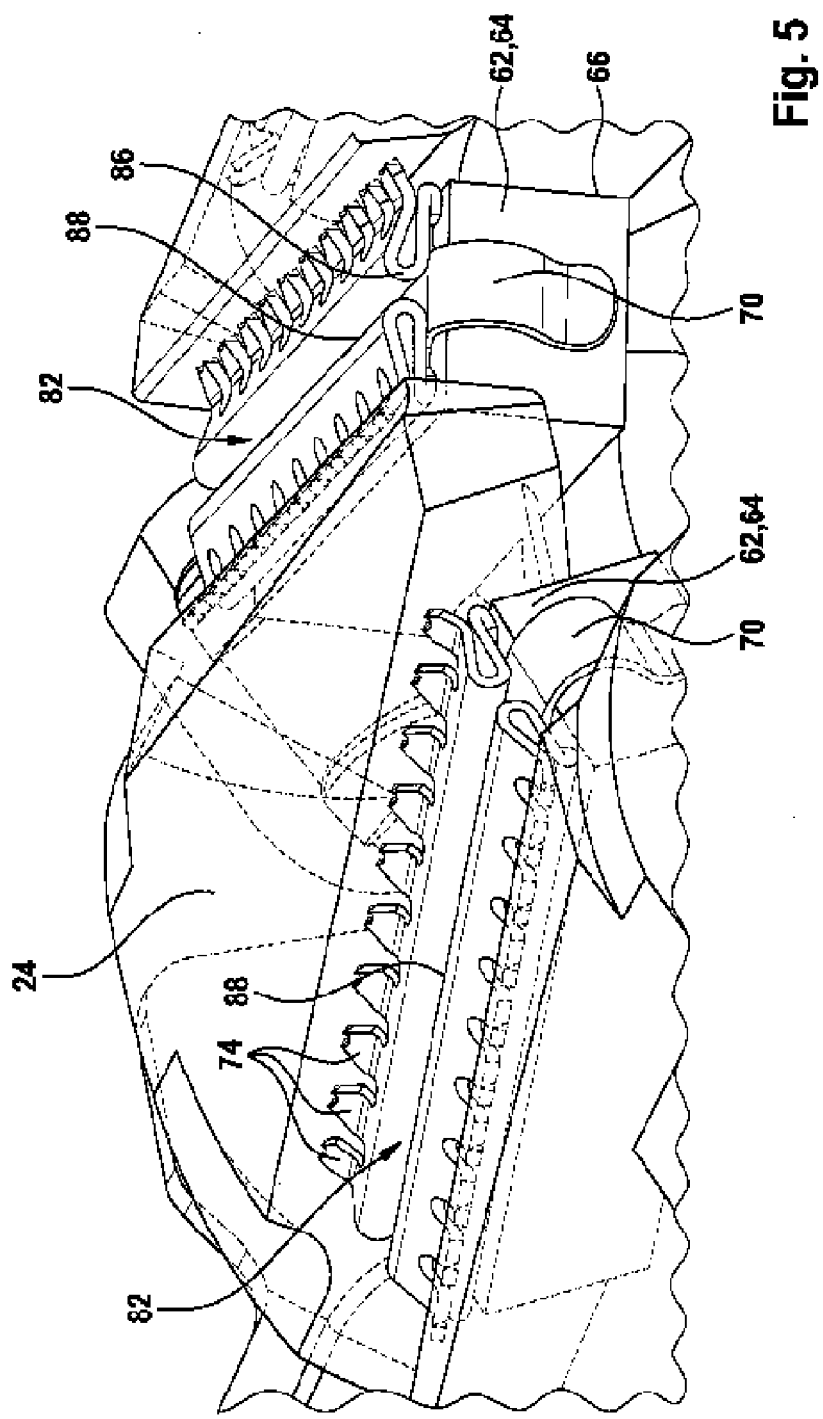
FIG. 5 shows an illustration of the second design variant of the holding element proposed according to the invention from a different perspective, FIGS. 6.1, 6.2 and 6.3 show illustrations of the holding element proposed according to the invention in its second design variant from its end side, from the side and from above.

The illustration according to FIG. 5 shows a detail from FIG. 4 on an enlarged scale.

FIG. 5 shows that the second holding elements 82 are supported by way of their claw-like projections 74, starting from the double lug 84 on the second holding element 82 against the flanks 80 of the claw-pole fingers 24 and 25 which are left unprocessed. If, as indicated in the illustration according to FIG. 4 and FIG. 5, the contact area of the claw-like projections 74 is provided with a claw-like geometry 90, this may result in even better clawing, that is to say fixing, of the second holding elements 82 on the flanks 80 of the claw-pole fingers 24 and 25 which are left unprocessed when the centrifugal force effect begins when the rotor 20 rotates. The second design variant of the holding element proposed according to the invention illustrated in FIGS. 4 and 5 furthermore minimizes the air gaps which are produced in the intermediate spaces 60 between the permanent magnet 62 and the flanks 80 of the claw-pole fingers 24, 25, and therefore the greatest possible lateral surface overlap between the permanent magnets 62 and the flanks 80 of the claw-pole fingers 24, 25 is achieved and considerably greater throughflow areas for the magnetic flux are established.

The sequence of figures comprising FIGS. 6.1 to 6.3 shows views of the second design variant of the holding element proposed according to the invention. The sequence of figures comprising FIGS. 6.1 to 6.3 shows that, according to FIG. 6.1, the spring lugs 70 overlap the end sides 64 of the permanent magnets 62. The longitudinal side 66 of the permanent magnets 62 is significantly longer in comparison to the end side 64. The second holding elements 82 are provided with the rounded portion 86, with the double lug 84 being generated, said double lug once again allowing production of the second holding element 82 from a non-electromagnetic material with a relatively thin sheet-metal thickness.

FIG. 6.2 shows a side view of the second holding element according to the invention.

FIG. 6.2 shows that the two sprung lugs 70 on the short sides of the second holding element 82 are formed opposite one another. The claw-like projections 74 protrude laterally from the top side 72 of the second holding element 82 through recesses at a distance from one another and yielding at an angle in the upward direction.

The illustration according to FIG. 6.3, which illustrates a plan view of the second holding element 82, shows that, in order to improve the clawing effect on the flanks 80 of the claw-pole fingers 24, 25 which are left unprocessed, the claw-like projections 74 are provided with a pointed geometry 90 on the sides which are situated opposite the flanks 80 which are left unprocessed. The points allow better clawing of the second holding element 82 when the rotor 20 rotates, and an increasing centrifugal force advantageously results in the clawing forces between the claw-like projections 74 of the second holding elements 82 on one hand and the flanks 80, which are left unprocessed, of the claw-pole fingers 24, 25 being increased. The recesses 76 between the individual claw-like projections 74 shown in FIG. 6.3 also allow an impregnating material to enter the remaining hollow spaces between the second holding element 82 and, for example, the upper side of the permanent magnet 62 and the longitudinal side 66 thereof and to cure there, so that a more flexurally rigid composite comprising the second holding element 82 and the permanent magnets 62 which are fixed by said holding element is produced.

Figure 7:
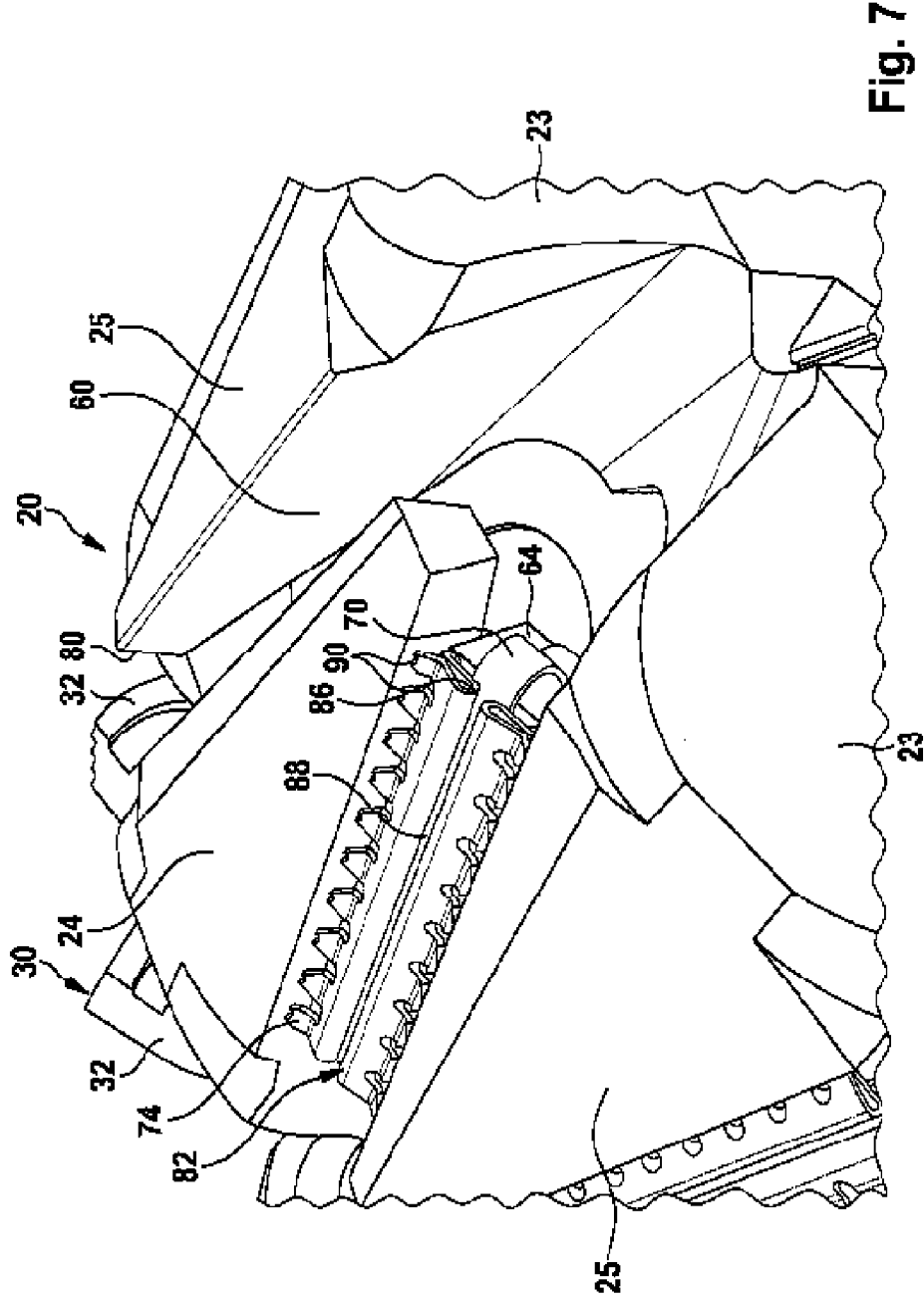
FIG. 7 shows a plan view of a rotor of an electrical machine having permanent magnets which are fitted in an intermediate space between two claw-pole fingers and are fixed by the holding element proposed according to the invention in its second design variant.

FIG. 7 shows a perspective plan view of a clearance between two claw-pole fingers which are situated opposite one another and also shows a second holding element, which is fitted in that very clearance, within the meaning of the proposed invention.

The illustration according to FIG. 7 shows that the claw-like projections 74 of the second holding element 82 are each provided with engaging and clamping double points a pointed contour 90, so that point-to-point contact is established between the claw-like projections 74 formed in a sprung manner at the setting angle 78 and the flanks 80 of the individual claw-pole fingers 24 and 25 which are left unprocessed. The gaps therebetween are filled and wetted with impregnating agent. As a result, the system is fixed and, despite this, in a position to compensate for stresses in a sprung manner. This point-to-point contact is further increased when the rotor starts to rotate by virtue of the centrifugal force starting, and therefore the permanent magnet 62, which is forced outward and places stress on the second holding element 82 from the lower side of the top side 72 due to the outwardly acting centrifugal force, additionally increases the force between the claw-like projections 74 and the flanks 80 of the claw-pole fingers 24, 25 as a function of the rotation rate of the rotor 20. Consequently, the clamping force with which the permanent magnets 62 are fixed in the intermediate spaces 60 is intensified as a function of the rotation speed of the rotor 20, this forming an additional advantageous effect of the solution proposed according to the invention.

The illustration according to FIG. 7 shows that the end sides 64 of the permanent magnet 62 are fixed by the sprung lug 70 in the axial direction axially and radially inward, a longitudinal slot 88 which extends in the axial direction remains between the rounded portions 86 of the double lug 84 and has a positive influence on the spring characteristics of the double lug 84, originating from the rounded portion 86.

The illustration according to FIG. 7 shows, in a manner lying in the plane of the image, individual fan blades 32 of the fan 30. The fans 30, only one of said fans being illustrated in the illustration according to FIG. 7, are located in the region of the outer sides of the claw-pole boards 22, 23, the individual claw-pole fingers 24 and 25 of said claw-pole boards extending in an alternating sequence and bounding the intermediate spaces 60 for accommodating the permanent magnets 62.

The invention claimed is:

1. A holding element (68, 82) for attaching magnets (62) to a rotor (20) of an electrical machine (10) in intermediate spaces (60) between poles (24, 25) of the electrical machine (10), with the holding element (68, 82) comprising a top side (72) arranged in a plane and spring lugs (70) which axially fix the magnets (62), characterized in that the holding element (68, 82) has claw-like projections (74) projecting towards the poles (24,25) and above the top side (72) which bear against slotless flanks (80) of the poles (24, 25) when the holding element (68, 82) is in a fitted state, the slotless flanks (80) having a flat surface, wherein the plane is transverse to the slotless flanks (80).

2. The holding element according to claim 1, characterized in that the poles are claw pole fingers (24, 25) of claw-pole boards (22, 23) of a claw-pole generator.

3. The holding element according to claim 2, characterized in that the holding elements (68, 82) arrest permanent magnets (62) in intermediate spaces (60) between two adjacent claw-pole fingers (24, 25) and the holding elements (68, 82) are pushed against the slotless flanks (80) of the claw-pole fingers (24, 25) by a centrifugal force effect when the rotor (20) rotates.

4. The holding element according to claim 1, characterized in that the claw-like projections (74) are of sprung design.

5. The holding element according to claim 4, characterized in that the claw-like projections (74) are separated from one another by recesses (76).

6. The holding element according to claim 1, characterized in that the claw-like projections (74) from a top side (72) of the holding element (68, 82) are set at a setting angle (78).

7. The holding element according to claim 1, characterized in that the holding element (82) has a sprung double lug (84) located on the top side (72) from which the claw-like projections (74) extend laterally.

8. The holding element according to claim 7, characterized in that the double lugs (84) each have rounded portions with a 180° deflection (86) which act as springs.

9. The holding element according to claim 1, characterized in that the claw-like projections (74) each have pointed points (90) which form point-to-point contact to the slotless flanks (80) of the poles (24, 25).

10. The holding element according to claim 1, characterized in that the holding elements (68, 82) have recesses (76) through which a flowable medium flows between holding elements (68, 82) and the permanent magnet (62), and cures.

11. The holding element according to claim 10 wherein the flowable medium is an impregnating agent.

12. An electrical machine (10) comprising:
poles (24, 25) defining an intermediate space (60) therebetween, the poles (24, 25) having respective slotless flanks (80) formed with a flat surface;
a magnet (62); and
a holding element (68, 82) for attaching the magnet (62) to the poles (24, 25), the holding element (68, 82) including a top side (72) arranged in a plane and spring lugs (70), the holding element (68, 82) having claw-like projections (74) projecting towards the poles (24,25) and above the top side (72) which bear against the slotless flanks (80) of the poles (24, 25) when the holding element (68, 82) is in a fitted state, wherein the plane is transverse to the slotless flanks (80).

13. The electrical machine according to claim 12, wherein the poles (24, 25) are claw pole fingers (24, 25) of claw-pole boards (22, 23) of a claw-pole generator.

14. The electrical machine according to claim 12, wherein the claw-like projections (74) are of sprung design.

15. The electrical machine according to claim 14, wherein the claw-like projections (74) are separated from one another by recesses (76).

16. The electrical machine according to claim 12, wherein the claw-like projections (74) from a top side (72) of the holding element (68, 82) are set at a setting angle (78).

17. The electrical machine according to claim 12, wherein the holding element (82) has a sprung double lug (84) located on the top side (72) from which the claw-like projections (74) extend laterally.

18. The electrical machine according to claim 17, wherein the double lugs (84) each have rounded portions with a 180° deflection (86) which act as springs.

19. The electrical machine according to claim 12, wherein the claw-like projections (74) each have pointed points (90) which form point-to-point contact to the slotless flanks (80) of the poles (24, 25).

20. The electrical machine according to claim 12, wherein the holding elements (68, 82) have recesses (76) through which a flowable medium flows between holding elements (68, 82) and the permanent magnet (62), and cures.

* * * * *